United States Patent [19]

Matsuda

[11] Patent Number: 5,606,316
[45] Date of Patent: Feb. 25, 1997

[54] SIGNAL INPUT SYSTEM FOR AN ELECTRONIC EQUIPMENT

[75] Inventor: Norio Matsuda, Saitama-ken, Japan

[73] Assignee: Pioneer Electronic Corporation, Tokyo, Japan

[21] Appl. No.: 626,945

[22] Filed: Apr. 3, 1996

[30] Foreign Application Priority Data

Apr. 4, 1995 [JP] Japan ................................. 7-078785

[51] Int. Cl.$^6$ .................................................. H03K 17/94
[52] U.S. Cl. ............................ 341/20; 340/990; 340/995; 345/121
[58] Field of Search ......................... 341/20; 318/568.11, 318/432; 200/6 A; 345/145, 146, 133, 121, 127; 74/471 XY; 364/449; 340/990, 995

[56] References Cited

U.S. PATENT DOCUMENTS

| | | | |
|---|---|---|---|
| 4,604,016 | 8/1986 | Joyce | 74/471 XY |
| 4,706,006 | 11/1987 | Solomon | 318/640 |
| 5,185,561 | 7/1993 | Good | 318/432 |
| 5,278,763 | 1/1994 | Agnew | 364/449 |
| 5,354,162 | 11/1994 | Burdea | 414/5 |
| 5,396,430 | 3/1995 | Arkawa | 364/449 |
| 5,398,188 | 3/1995 | Maruyama | 364/449 |
| 5,436,638 | 7/1995 | Bolas | 345/156 |
| 5,442,557 | 8/1995 | Kaneko | 364/449 |
| 5,459,382 | 10/1995 | Jacobson | 318/568.11 |
| 5,510,810 | 4/1996 | Nishijima | 345/156 |
| 5,512,892 | 4/1996 | Corballis | 341/20 |
| 5,537,323 | 7/1996 | Schulte | 364/449 |

*Primary Examiner*—Jeffery Hofsass
*Assistant Examiner*—Albert K. Wong
*Attorney, Agent, or Firm*—Nikaido, Marmelstein, Murray & Oram LLP

[57] ABSTRACT

An electronic equipment has a stick as a movable input device provided to be manually moved. The position of the stick is detected. In accordance with the detected position, the movement of the stick is restricted within a predetermined movable range so as to be moved a plurality of predetermined areas. The area in which the stick is located is detected. In accordance with the detected area, corresponding control data stored in a memory are read out, and the electronic equipment is controlled by the read out control data.

6 Claims, 7 Drawing Sheets

FIG.9

SIGNAL INPUT SYSTEM FOR AN ELECTRONIC EQUIPMENT

BACKGROUND OF THE INVENTION

The present invention relates to a signal input system for an electronic equipment such as an automotive navigation system.

As an example of the electronic equipment for selectively processing functions in accordance with an input command through an external input device, an automotive navigation system is provided in a vehicle for selecting a command by operating an operation key and for indicating information such as a route and a direction responsive to the command.

Figure 9:
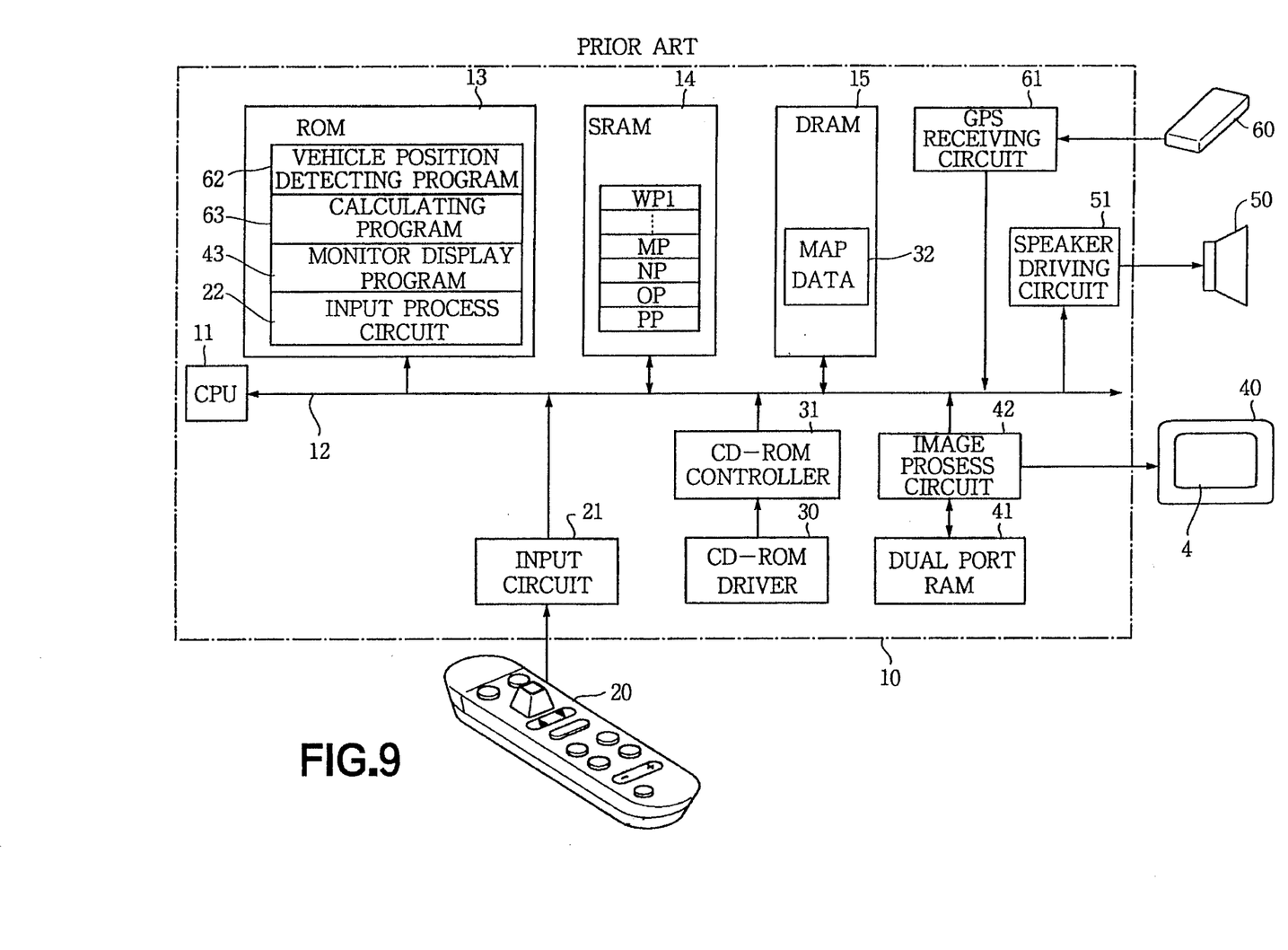
FIG. 9 is a block diagram showing a conventional automotive navigation system.

FIG. 9 shows a conventional automotive navigation system. The automotive navigation system comprises a main system 10, a speaker 50, a global positioning system (GPS) antenna 60, a monitor 40 having a display 4, and a remote controller 20 as an input device.

The main system 10 comprises a CPU 11, an input circuit 21, a ROM 13, a SRAM 14, a DRAM 15, a CD-ROM controller 31, an image process circuit 42, a speaker driving circuit 51, and a GPS receiving circuit 61. These elements are connected to the CPU 11 through a bus line 12. The image process circuit 42 is connected to the monitor 40. The speaker driving circuit 51 is connected to the speaker 50. The GPS receiving circuit 61 is connected to the GPS antenna 60. The main system 10 further has a CD-ROM driver 30 connected to the CD-ROM controller 31 and a dual port RAM 41 connected to the image process circuit 42.

The ROM 13 has a plurality of programs such as an input process program 22, a monitor display program 43, a vehicle position detecting program 62, and a calculating program 63.

The remote controller 20 has a plurality of operation keys corresponding to functions of the main system. A desired process is selected by depressing a corresponding key. The remote controller 20 produces a command signal which is transmitted to the input circuit 22 of the main system for selecting a program stored in the ROM 13. The selected program is processed by the CPU 11. Thus, information such as a route guidance is obtained by the monitor 40 indicated on the display 4 thereof.

Operation of the system will be described.

Before starting the vehicle, for example, if the remote controller 20 is operated for selecting a command for reading a map data, a map data 32 is read through the CD-ROM driver 30 and the read data is stored in the DRAM 15. Furthermore, if keys corresponding to commands for setting a goal and a marking are depressed, corners to be tuned WP1 . . . and a destination are set and the set data are stored in the SRAM 14.

During driving the vehicle, if the remote controller 20 is operated to select an operating mode of navigation, a present point of the vehicle detected based on information received from a satellite through the GPS antenna 60 and a turning information at the next corner WP1 are indicated on a map shown on the display 4 of the monitor 40 by markings. Furthermore, if it is determined by calculation that the vehicle approaches the corner, the information is indicated by sound through the speaker 50 such as "Please turn to the right at a next cross.".

On the display 4, it may happen that a picture such as a map is too wide to read a small area or a point to be checked is out of the display. In such cases, the driver may operate the remote controller 20 to expand, contract, or scroll the picture, or perform a search. Furthermore, in order to coincide a heading direction of the vehicle with the route direction on the picture, it is desired to inversely turn the picture. The driver operates the remote controller even if the vehicle is driven.

However, during driving the vehicle, since it is necessary to watch the heading direction and opposed vehicles, it is difficult to operate the remote controller and extremely limited to watch the remote controller.

It is desirable to reduce a burden to the driver for operating the remote controller.

SUMMARY OF THE INVENTION

An object of the present invention is to provide an input system for an electronic equipment where the burden on an operator is reduced when an input device of the system is operated.

Another object of the present invention is to provide an input system which is applicable to input various functions with a simple manipulation.

A further object of the present invention is to provide an input system where a function is easily changeable.

A still further object of the present invention is to provide an input system which may prevent erroneous operations.

According to the present invention, there is provided a signal input system for an electronic equipment comprising a movable input device provided to be manually moved, first detector means for detecting the position of the movable input device, and for producing a position signal, first control means responsive to the position signal for restricting the movement of the movable input device within a predetermined movable range so as to be moved a plurality of predetermined areas, second detector means for detecting the area in which the movable input device is located, and for producing an area signal, a memory storing control data for each of the areas, second control means responsive to the area signal for reading corresponding control data in the memory, and for operating the electronic equipment in accordance with the read out control data.

The movable input device may be a stick provided to be rotated within two planes which are perpendicular to each other.

These and other objects and features of the present invention will become more apparent from the following detailed description with reference to the accompanying drawings.

DETAILED DESCRIPTION OF THE PREFERRED EMBODIMENTS

Figure 1:
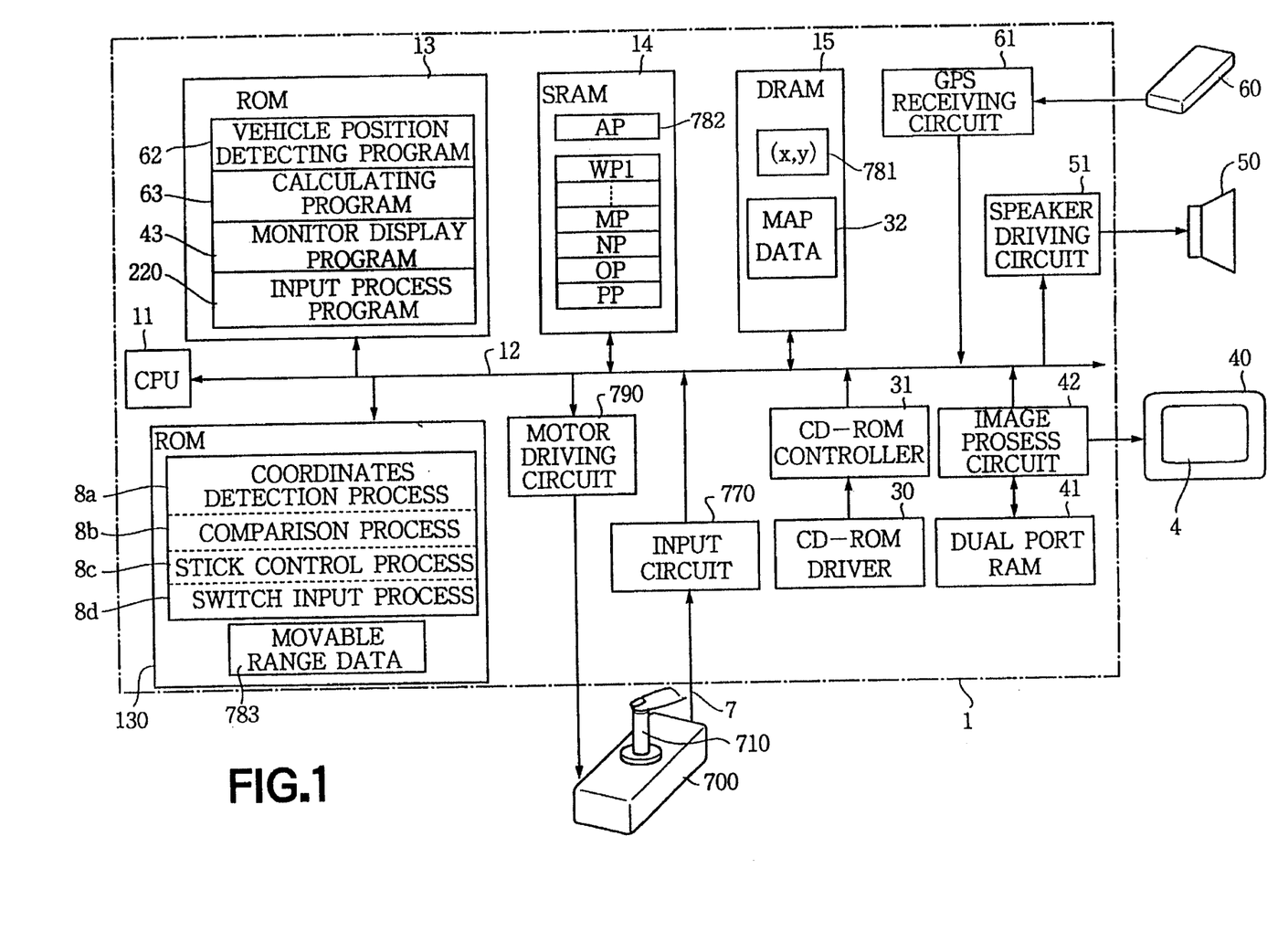
FIG. 1 is a block diagram showing an automotive navigation system in which an input system according to the present invention is provided.

Referring to FIG. 1 showing an automotive navigation system of the present invention, the automotive navigation system has an input device 700 in place of the conventional remote controller 20. A main system 1 which has the same structure as the conventional system 10 further comprises an input circuit 770, a motor driving circuit 790, and a ROM 130, which are connected to the CPU 11 through the bus line 12. The ROM 130 comprises an input program 780 and a movable range data 783.

Other structures of the system are the same as the conventional system of FIG. 9 and the same parts thereof are identified with the same reference numerals as FIG. 9.

Figure 2:
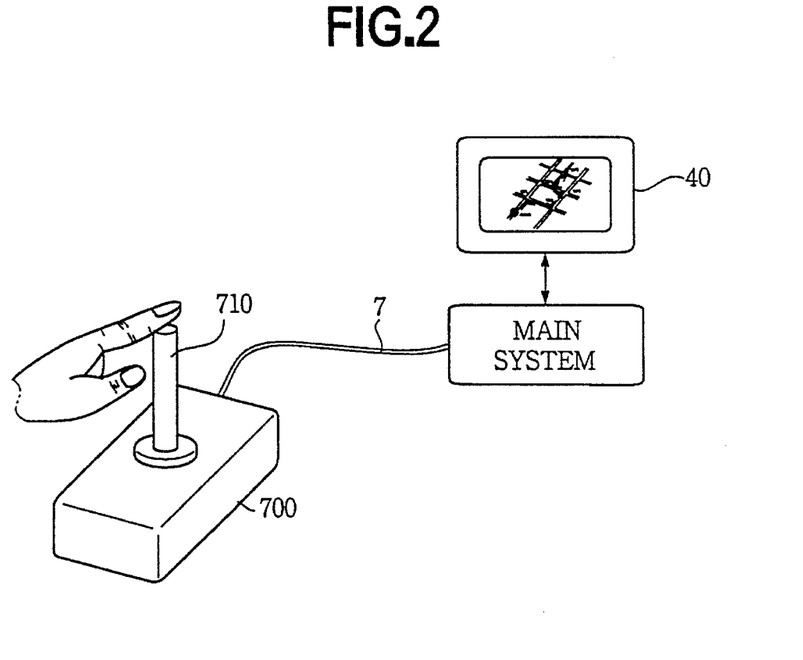
FIG. 2 is a schematic diagram showing the automotive navigation system.

Referring to FIG. 2, the input device 700 has a pivotable operating stick 710 manipulated by a hand and a finger of a driver and is connected to the main system 1 through a cable 7.

Figure 4:
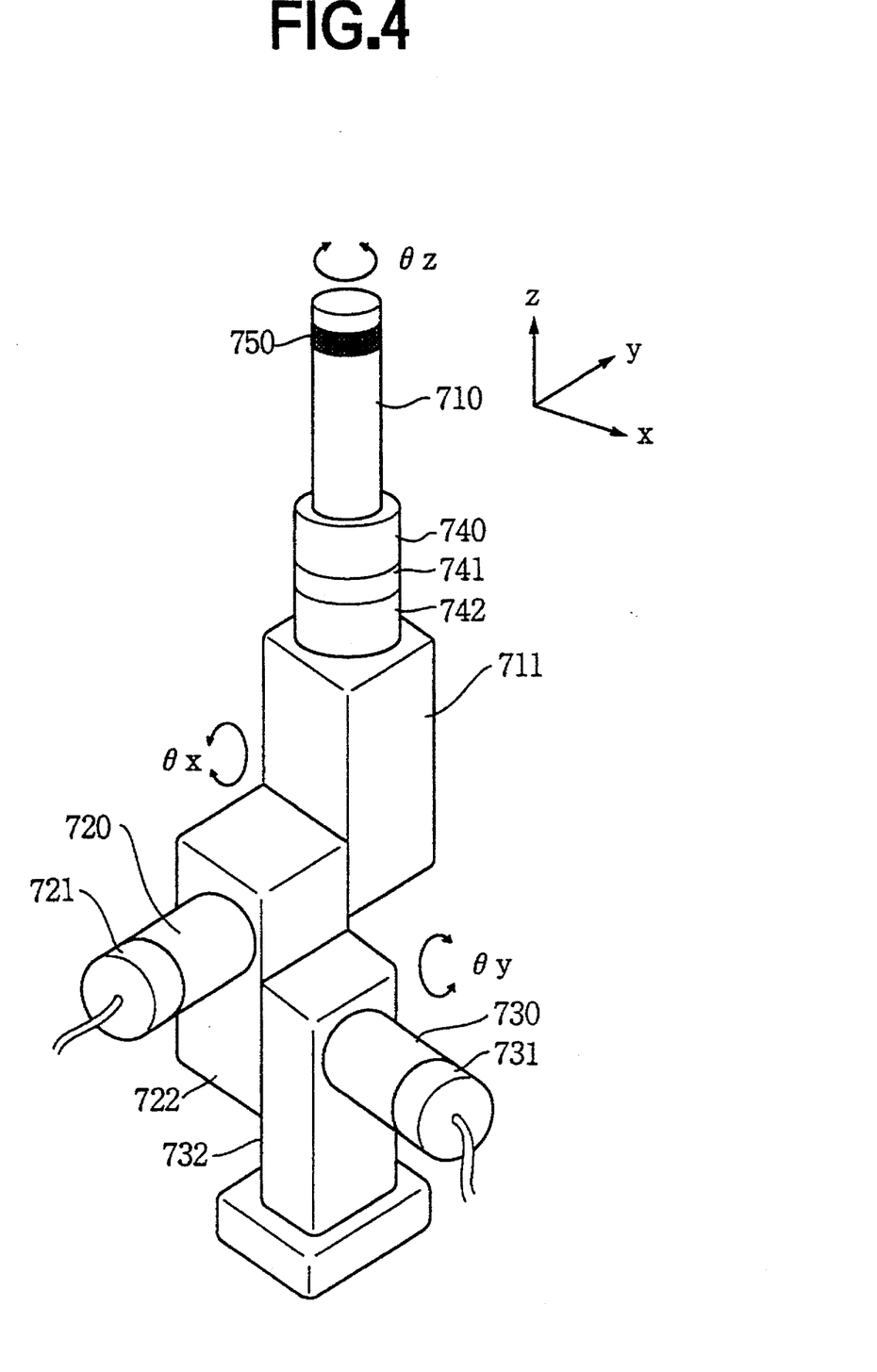
FIG. 4 is a perspective view showing an input device of the present invention.

Referring to FIG. 4, the stick 710 having a free end is coaxially connected to a motor 740 and a rotary encoder 741. The rotary encoder 741 is mounted on a cylindrical arm 742 secured to a cubic arm 711. The cubic arm 711 is rotatably connected to a cubic arm 722 at the other end.

The cubic arm 722 has a restricting motor 720 and a rotary encoder 721. The rotary encoder 721 is provided for detecting an inclination angle of the stick 710. The cubic arm 722 is rotatably connected to a cubic arm 732 at the other end. The cubic arm 732 has a restricting motor 730 and an angle detecting rotary encoder 731, and is secured to a casing of the input device 700 at a base portion. The motors 720 and 730 are provided to restrict the movement of the manually operated stick 710 within a predetermined range.

The motors 720 and 730 are operated by the motor driving circuit 790. The cubic arm 711 is rotated by the motor 720 in an x-y plane at an angle θx in opposite directions. Thus, the free end of the stick 710 can be moved in the direction x. The cubic arm 722 is rotated by the motor 730 in a y-z plane at an angle θy in opposite directions. Thus, the free end of the stick 710 can be moved in the direction y.

Thus, the free end of the stick 710 can be moved in x and y directions by the motors 720 and 730 through the motor driving circuit 790.

A switch 750 is provided on the stick 710 for changing the operation modes as described hereinafter. The switch 750 is turned off in a normal state. When a tip end of the stick 710 is depressed, the switch 750 is turned on.

Referring back to FIG. 1, input means comprises an input process program 220 provided in the ROM 13 in place of the input process program 22 of FIG. 9, a stick information input means for inputting a command responsive to an operation of the stick, and a stick drive means for limiting the movable range of the stick.

The stick information input means comprises the stick 710 to be manually moved for inputting commands, a stick position detecting means for detecting coordinates of the stick and producing a position data of the stick, and a code data transmitting means responsive to the position data of the stick for transmitting a predetermined code data to the input process program 220.

The stick drive means comprises the stick 710 to be moved, a drive means for driving the stick, the movable range data 783 for limiting the movable range of the stick, a comparing means for comparing the stick position data of the stick position detecting means with a value of the the movable range data 783, and a control means responsive to the comparison of the comparing means for controlling the movement of the stick 710 within a predetermined movable range.

The input device 700 is connected to the input circuit 770 which is applied with output signals of the encoders 721, 731 and 741, and an output signal of the switch 750. The input circuit 770 produces a signal which is applied to the ROM 130 for processing the input program 780. The motor driving circuit 790 is operated in accordance with the input program 780 stored in the ROM 130 for driving the motors 720 and 730 so as to coincide the output signals θx and θy of the encoders 721 and 731 with the data stored in the program, and hence the stick 710.

Figure 6:
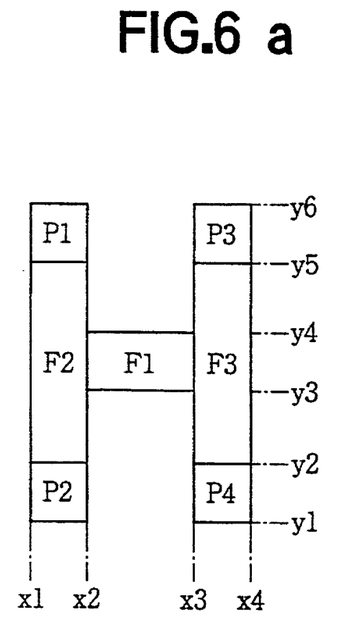
FIGS. 6a and 6b are diagrams showing position data of a movable range of the stick.
Figure 7:
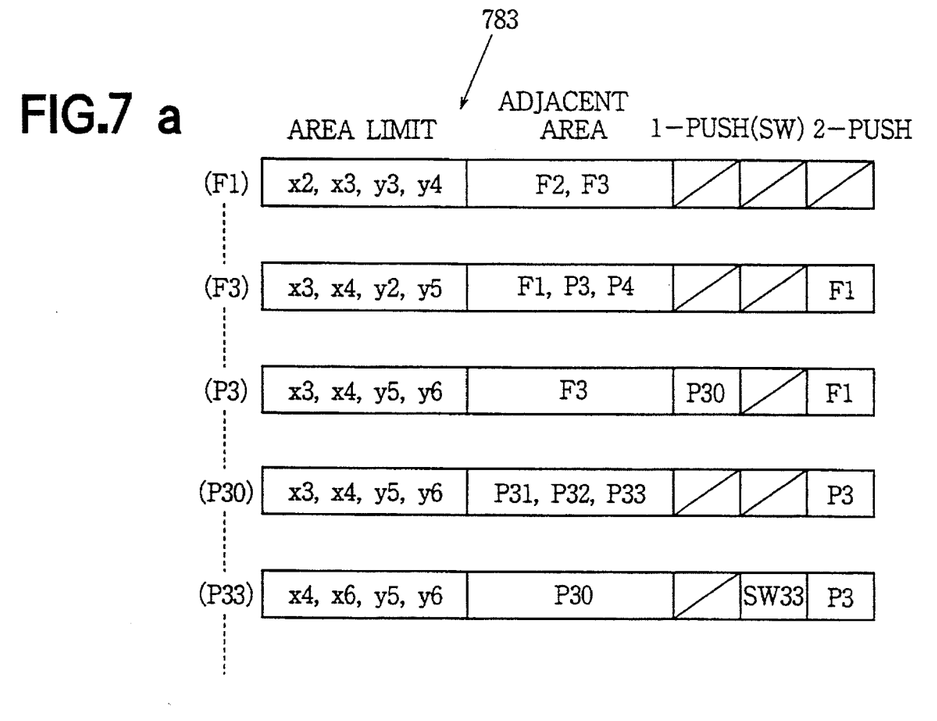
FIGS. 7a and 7b are diagrams showing data of the movable range of the stick.

The movable range of the stick 710 is restricted in the H shape as shown in FIG. 6a.

The movable range data 783 of the ROM 130 will be described with reference to FIGS. 6a to 7b. The movable range data 783 determines an area to allow movement of the stick 710. The data is composed of a collection of records for regulating a plurality of small areas. Each area is formed in square and smaller than a mechanically moved range, and defined by a lower limit and an upper limit in the x direction, and a lower limit and an upper limit in the y direction.

The functions of the automotive navigation system is classified in a four large divisions comprising a location function, GPS information function, route guidance function, and service function.

FIG. 6a shows the four large divisions represented by areas P1 to P4 which are formed in the H shape as a large classification. Each area is communicated through path areas F1 to F3.

Each of the four functions is further classified in small classes as a small classification. The location function is divided into a search and scroll of the map function, present point indication function, expansion and contraction function, and inverse function. The GPS information function is divided into a time schedule function, and receiving condition function. The route guidance function is divided into a destination set function, marking set function, and navigation function. The service function is divided into functions of information.

FIG. 6b shows the small area of the small classification of the area P3 of the route guidance function of the large classification. The small area comprises areas P30 to P33 having a convex shape.

FIG. 7a shows a record for regulating the areas such as F1, F3, P3, P30, and P33. Each area comprises items such as an area limit, adjacent area, a once pushing (1-push), switching (SW), and twice pushing (2-push).

Describing, for example the area P3, the area limit of the area P3 is determined by the lower limit x3 and the upper limit x4 in the x direction, and the lower limit y5, and the upper limit y6 in the y direction. The adjacent area is F3 where the stick 710 is movable. The 1-push is P30, which means that if the switch 750 is pushed once when the stick 710 is in the area P3, the classification is shifted from the large classification mode of the area P3 to the small classification mode of the area P30. The SW is blank where no code data exists to transmit to the input process program 220. The 2-push is F1 which means that if the switch is depressed at least twice when the stick 710 is in the area P3, a present area pointer AP of FIG. 7b is shifted from P3 to F1. Namely, the classification is changed from the small classification mode to the large classification mode.

FIG. 7b shows a program 782 of the present area pointer AP stored in the SRAM 14 (FIG. 1).

In the system, the movable range is layered corresponding to the classes of the functions, so that the movable range is easily stored in the program. Since the areas P31 to P33 are separately positioned through the area P30 as a communication path area. Thus, an erroneous input operation of the stick can be prevented.

Figure 5:
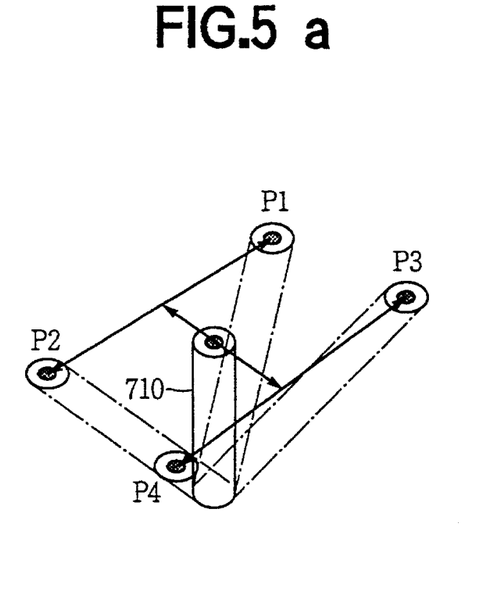
FIGS. 5a and 5b are diagrams showing moving operations of a stick of the input device.

FIGS. 5a and 5b show moving positions of the free end of the stick 710 in accordance with movable range data 783, which will be described hereinafter in detail.

FIGS. 8a to 8h show various examples of position data of the movable ranges.

Figure 8:
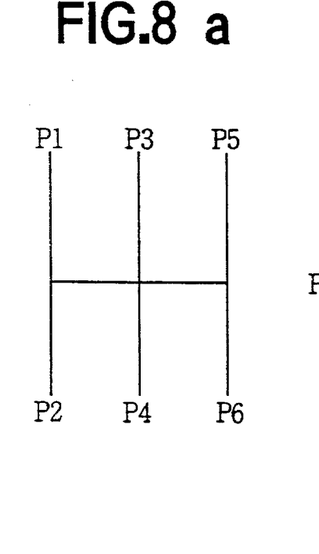
FIGS. 8a to 8h are schematic diagrams showing various examples of the position data of the movable range of the stick.

Data shown in FIGS. 8a to 8c are examples of the large classification, and data shown in FIGS. 8d to 8h are examples of the small classification.

Data shown in FIG. 8h is an example of a movable range obtained by rotating the free end of the stick 710 at an angle θz about the z axis in opposite directions. Thus, the rotating amount θz regulates the movable range in addition to the moving amounts in x and y directions.

The input program 780 comprises a coordinates detection process 8a, an area comparison process 8b, a stick control process 8c, and a switch input process 8d.

The coordinates detection process 8a is applied with output signals of the encoders 721 and 731 through the input circuit 770 for increasing or converting the coordinates in accordance with the input values to calculate an x-y position of the stick 710 on the (x, y) coordinates. The calculated x-y position is stored in a (x, y) data 781 of the DRAM 15.

The calculated x-y position data is applied to the area comparison process 8b where the calculated x-y position is compared with the value of the upper and lower limits set in the area limit pointed by the present area pointer AP of the movable range data 783. If the calculated x-y position is within the limit value, the actual value maintains the pointer AP.

If the calculated x-y position is out of the limit value, the calculated x-y position is further compared with each of the values of the upper and lower limits set in the adjacent areas of the movable range data 783, and with the values of the limit area of each adjacent area. If the calculated x-y position is within any one of the limit values, a pointer of the area corresponding to the limit value is stored in the AP data 782.

Thus, the moving area of the stick 710 is determined.

If the calculated x-y position is out of the areas, the stick control process 8c is operated to actuate a necessary motor 720 or 730, so that the stick 710 is returned in the movable range of the movable range data 783. If the present area pointer AP is F1, a difference (x2-x, y3-y) between the value of coordinates (x2, y3) of the area limit of the area F1 and the calculated x-y position (x, y) is obtained. The motors are driven by the motor driving circuit 790 in accordance with the stick control process 8c so that the stick 710 is controlled to be moved by the difference (x2-x, y3-y).

The switch input process 8d is operated in accordance with the output signal of the switch 750. If the switch 750 is turned on once during a predetermined short period, the switch input process 8d is operated for transmitting a code data. For example, if the switch 750 is depressed once when the stick is in the area P33 of the area P3, a switch SW33 is operated, to set a code data of a switch SW33 in the item SW of the movable range data 783 pointed by the present area pointer AP to the input process program 220 of the ROM 30.

In this state, a pointer, such as P30, set in the item 1-push is stored in the data 782 of the present area pointer AP.

If the switch 750 is turned on twice or more during a predetermined short period, a pointer, such as P3, of the item 2-push is stored in the data 782.

If there is a capacity in the ROM 13, the data in the ROM 130 are stored in the ROM 13, so that the ROM 130 is omitted.

As to a reading means, in order to read the map data 32 and store the read data in the DRAM 15, the CD-ROM driver 30 and the CD-ROM controller 31 are provided to be operated by a reading program (not shown).

As to a vehicle position detecting means, a present point MP of the vehicle is detected by a method such as a multi-satellite simultaneous measuring method. In order to detect the present location of the vehicle, the GPS antenna 60 for receiving waves from a GPS satellite, and the GPS receiving circuit 61 connected to the GPS antenna 60 are provided. The position detecting program 62 calculates the information of the present location of the vehicle in accordance with the received data.

As to a corner turning information calculating means, turning information of a place previously set such as a next set place NP, a direction information OP, and a distance information PP are calculated by the calculating program 63 based on the present point MP.

As to a visual information indicating means, in order to indicate the information including the turning information on the display 4 of the monitor 40, the monitor display program 43 operates to convert the map data 32 and the information into picture data and store the data in the dual port RAM 41 through the image process circuit 42.

As to an acoustic information indicating means, in order to indicate the information including the turning information through the speaker 50, a sound producing program (not shown) operates to convert the information into an audio data and apply the data to the speaker driving circuit 51 connected to the speaker 50.

The operation of the system will be described.

Before starting the vehicle, namely when the vehicle is stopped, a data input mode of the operating mode is selected by operating the stick 710 of the input device 700. A CD-ROM having a map data corresponding to the destination is selected and set in the CD-ROM driver 30. The data is read by the reading program and stored in the DRAM 15 as the map data 32. The map data 32 is a most basic data which is always referred for the route guidance.

Furthermore, route data such as corner turning WP1 . . . are set by using the stick and stored in the SRAM 14. The route is automatically set only by setting a start point and a destination, thereby calculating a proper route, or manually set by setting the places on the way. Thus, the necessary steps for starting the route guidance are completed.

Figure 3:
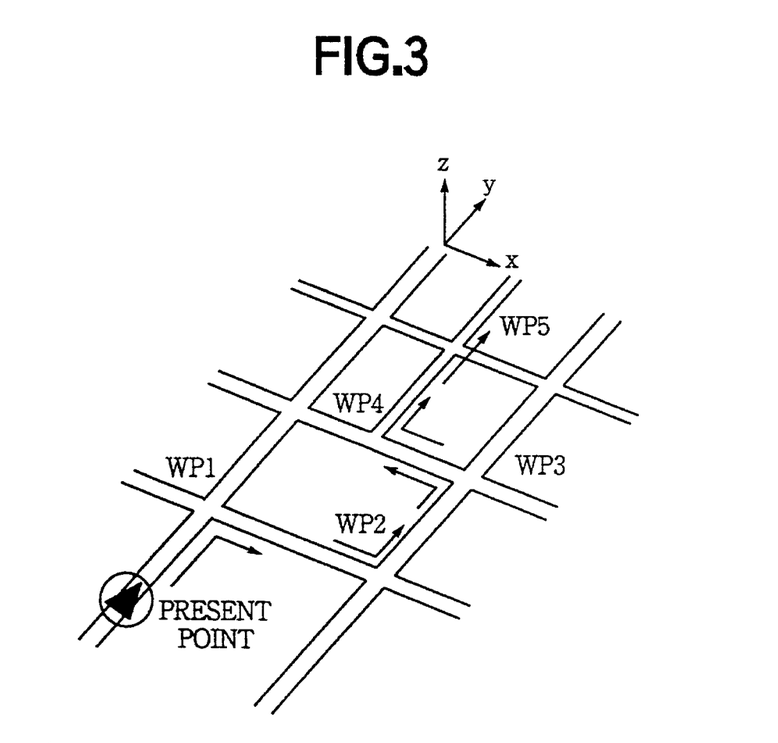
FIG. 3 is a diagram showing a route set by the system.

Thereafter, the data input mode is changed to a route guidance mode. The present point MP is detected by the position detecting program 63 based on the information received through the GPS antenna 60 and the GPS receiving circuit 61. The information such as the corner turning information NP is calculated by the calculating program 63. These data are stored in predetermined areas of the SRAM 14. The map data 32 having the present point MP is read out from the DRAM 15 by the monitor display program 43, applied to the dual port RAM 41 through the image process circuit 42, and stored in the RAM 41. The map data stored in the RAM 41 is read out by the circuit 42 and shown on the display 4 of the monitor 40 all the time. The information such as the corner turning information NP is indicated on the map by an arrow or a bent line as shown in FIG. 3. These processes are intermittently repeated in the route guidance mode. Thus, the driver can obtain the route guidance through the monitor.

When the vehicle is started, the present point MP is moved on the map, accordingly. If the vehicle approaches the next cross WP1 to be turned, the system determines that the distance PP between present point MP and next set place NP before the cross WP1 becomes smaller than a predetermined set value. At that time, the sound producing program operates the speaker 50 to sound the information of "Please turn on the right at the next cross.". Thus, the driver can obtain the route guidance through the speaker.

During driving the vehicle, the driver may wish to change the operation of the navigation system. In this case, it is necessary to input a proper command by operating the stick 710 of the input device 700 by the driver. In the navigation system, since the stick 710 is projected from the input device 700, the driver can easily and ensurely grip the stick 710 without watching the stick during driving the vehicle. The stick 710 is moved in the movable range and operated to confirm the input process. Thus, a code data corresponding to the desired command is applied to the input process program 220 where the desired command is selected and processed.

The moving operation of the stick 710 will be described with reference to FIGS. 5a to 6b. A desired command is processed in accordance with programs shown in FIGS. 7a and 7b. In the program, it is assumed that the area P30 and the code data of the switch SW33 are recorded.

As shown in FIGS. 5a and 6a, the stick 710 is in the area F1 at first and the present area pointer AP of the program 782 is set to F1. The stick can be moved within the area F1. If the stick is moved in an upper direction or a lower direction (in figure) beyond the area F1, the stick is returned to the area F1 by the motors 720 and 730 in the stick control process 8c of the stick input program 780. The stick can be moved in the lateral directions to the adjacent areas F2 and F3. The stick is moved to the right and reaches the area F3. The present area pointer AP of F1 changes to F3.

In the area F3, the stick 710 can be moved in the vertical directions to the adjacent areas P3 and P4. The stick is moved in the upper direction and reaches the area P3. The present area pointer AP of F3 changes to P3.

Then, the tip end of the stick 710 is pushed once to turn on the switch 750 so that the classification of the stick is shifted from the large classification mode of the area P3 to the small classification mode of the area P30. The present area pointer AP of P3 changes to P30.

As shown in FIGS. 5b and 6b, the stick is moved to the right and reaches the area P33. The present area pointer AP of P30 changes to P33. The switch at the area P33 is closed, so that the code data SW33 is applied to the input process program 220.

In order to select another command of the same class, the stick is moved from the area P30 to another area P31 or P32 to turn on a corresponding switch.

In order to select a command of another large area, the switch 750 is turned on at least twice, and the stick 710 is shifted to a desired area.

Thus, the selection and process of the desired command are performed only by operating the stick 710.

As a result, it is not necessary to watch the operation keys, thereby removing a visual burden to the driver.

The automotive navigation system having the input system according to the present invention is applicable to a navigation system for a ship and to other electronic equipments.

The movable range data 783 can be stored in the SRAM 14 or an EPROM in place of the ROM 130. In this case, a movable range data demarcation program for calculating a limit of the area having a rectangular or circular shape including a moving trace of the stick 710, and a movable range data set and update program for adding a new record or deleting the record, and for changing a part of the record based on the calculated limit are further provided. Since the data are rewritable, it is possible to conveniently change the movable range by the manufacturer or the user. Thus, the function is easily and conveniently changed.

In accordance with the present invention, the pivotable stick is provided as the input device for selecting and processing the desired function. Thus, it is not necessary to watch operation keys, thereby removing a visual burden to an operator when the input device is operated.

Since the movable range of the stick is regulated by the data, the stick is applicable to various functions with a simple structure. Furthermore, it is possible to update the set of the movable range, so that the function is easily changed.

Each of the areas of classification modes is separately positioned, the erroneous input operation does not occur.

While the invention has been described in conjunction with preferred specific embodiment thereof, it will be understood that this description is intended to illustrate and not limit the scope of the invention, which is defined by the following claims.

What is claimed is:

1. A signal input system for an electronic equipment comprising:

a movable input device provided to be manually moved;

first detector means for detecting the position of the movable input device, and for producing a position signal;

first control means responsive to the position signal for restricting the movement of the movable input device within a predetermined movable range so as to be moved a plurality of predetermined areas;

second detector means for detecting the area in which the movable input device is located, and for producing an area signal;

a memory storing control data for each of said areas;

second control means responsive to the area signal for reading corresponding control data in the memory, and for operating the electronic equipment in accordance with the read out control data.

2. The system according to claim 1 wherein the movable input device is a stick provided to be rotated within two planes which are perpendicular to each other.

3. The system according to claim 1 wherein the second detector means is a switch.

4. The system according to claim 1 further comprising a speaker, and driving means provided in the second control means for operating the speaker for generating acoustic information.

5. The system according to claim 2 wherein the first control means includes a pair of motors for rotating the stick.

6. The system according to claim 2 wherein the first detector means is an encoder for detecting an angular position of the stick.

* * * * *